Feb. 1, 1966 F. R. OFNER 3,232,486
FLOW-MEASURING SYSTEM
Filed Sept. 28, 1962 2 Sheets-Sheet 1

INVENTOR.
FRANK R. OFNER
BY John W. Graham
ATTORNEYS

Feb. 1, 1966  F. R. OFNER  3,232,486
FLOW-MEASURING SYSTEM
Filed Sept. 28, 1962  2 Sheets-Sheet 2
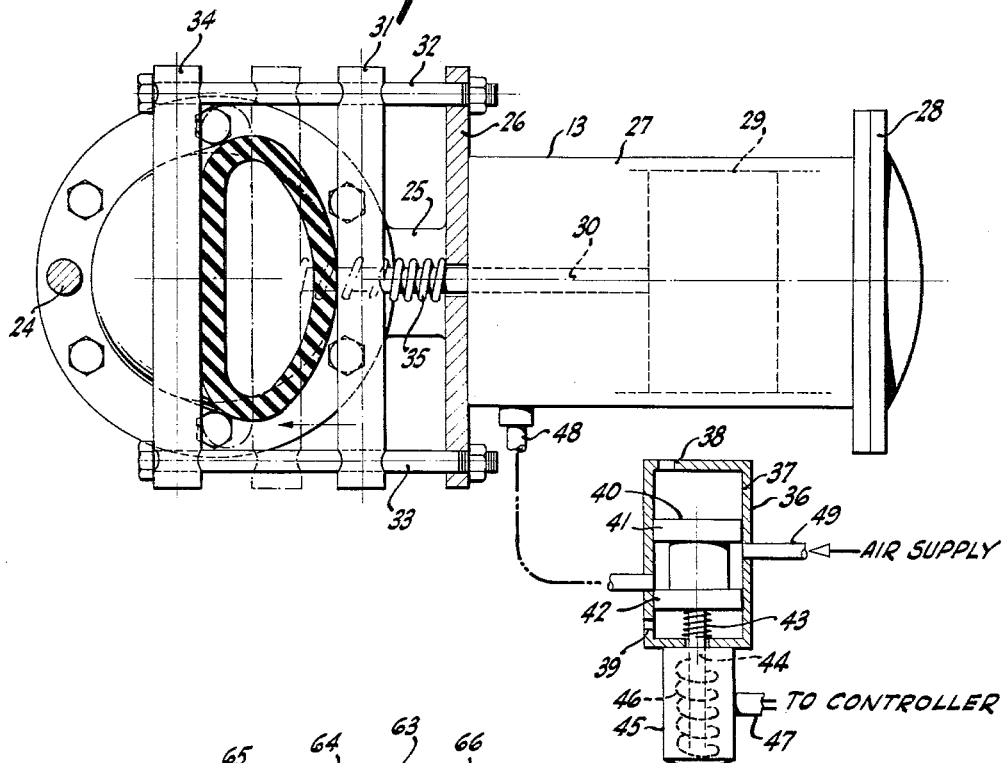
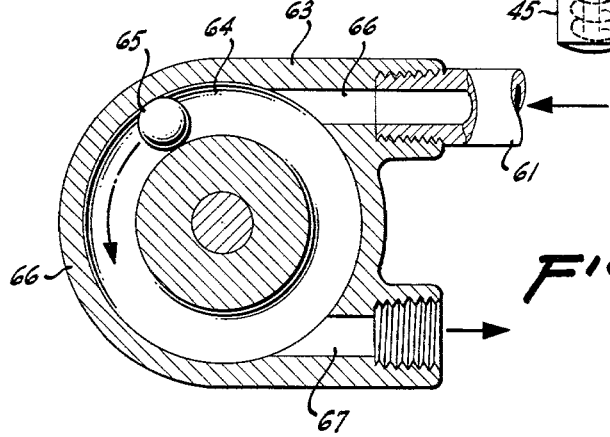
INVENTOR.
FRANK R. OFNER
BY John W. Graham
ATTORNEYS

# United States Patent Office 3,232,486
Patented Feb. 1, 1966

3,232,486
FLOW-MEASURING SYSTEM
Frank R. Ofner, Portland, Oreg., assignor to Industrial Powertronix, Inc., Portland, Oreg., a corporation of Oregon
Filed Sept. 28, 1962, Ser. No. 226,947
5 Claims. (Cl. 222—55)

This invention relates to a system for measuring the flow of materials through a conduit, and more particularly to a system for measuring the weight rate of flow of fluid materials such as granular and particulate substances, as disclosed in my copending patent application Serial No. 691,338, filed October 21, 1957, now Patent No. 3,056,293, of which the present application is a continuation-in-part.

An object of the present invention is to provide an improved system for measuring the weight rate of flow of materials through a conduit, especially solid particulate or pulverulent materials such as grain, flour, sugar, sand, solid fuels and the ingredients thereof, etc.

Another object of the invention is that of providing a system for measuring the flow of material through a conduit, and in which feedback control means are provided for regulatively adjusting the flow of such material in response to continuous measurements of the rate of flow thereof to maintain the same at preselected value.

Still another object is in the provision of a flow-measuring system in which one or more elements are located within a conduit section so as to be engaged by the material flowing therethrough, and in which means are included in association with such elements to impart mechanical energy thereto of a character that prevents the build-up of flow material thereon in the event that the material tends to cling thereto because of its inherent stickiness, because of electrostatic attractions or for any other reason.

A further object is to provide a flow-measuring system of the character described in which a sensing element is positioned and located within a conduit section so that material flowing therethrough impacts such element, and in which a flow interrupter is also disposed within such conduit section and is operative to convert the velocity of the material flowing therethrough to a known value at the moment of impact thereof with the sensing element—both the sensing element and interrupter being respectively equipped with selectively operable vibration-imparting means to prevent the adherence and build-up of material on such components.

Yet a further object is that of providing a flow-measuring system having the features described in which the sensing element thereof is supported for limited movement, generally along the longitudinal axis of the flow conduit section, in response to the magnitude of the force or weight rate of flow of the material impacting the same, and in which such tendency of the sensing element toward movement is effectively resisted by a force-responsive sensing or measuring cell so that the actual displacement of the sensing element is negligible and substantially non-existent within the range of forces accommodated by the system.

Additional objects and advantages of the invention will become apparent as the specification develops.

An embodiment of the invention is illustrated in the accompanying drawings, in which—

FIGURE 2 is a transverse sectional view taken generally along the line 2—2 of FIGURE 1; and FIGURE 3 is a broken transverse sectional view taken generally along the line 3—3 of FIGURE 1.

Figure 1:
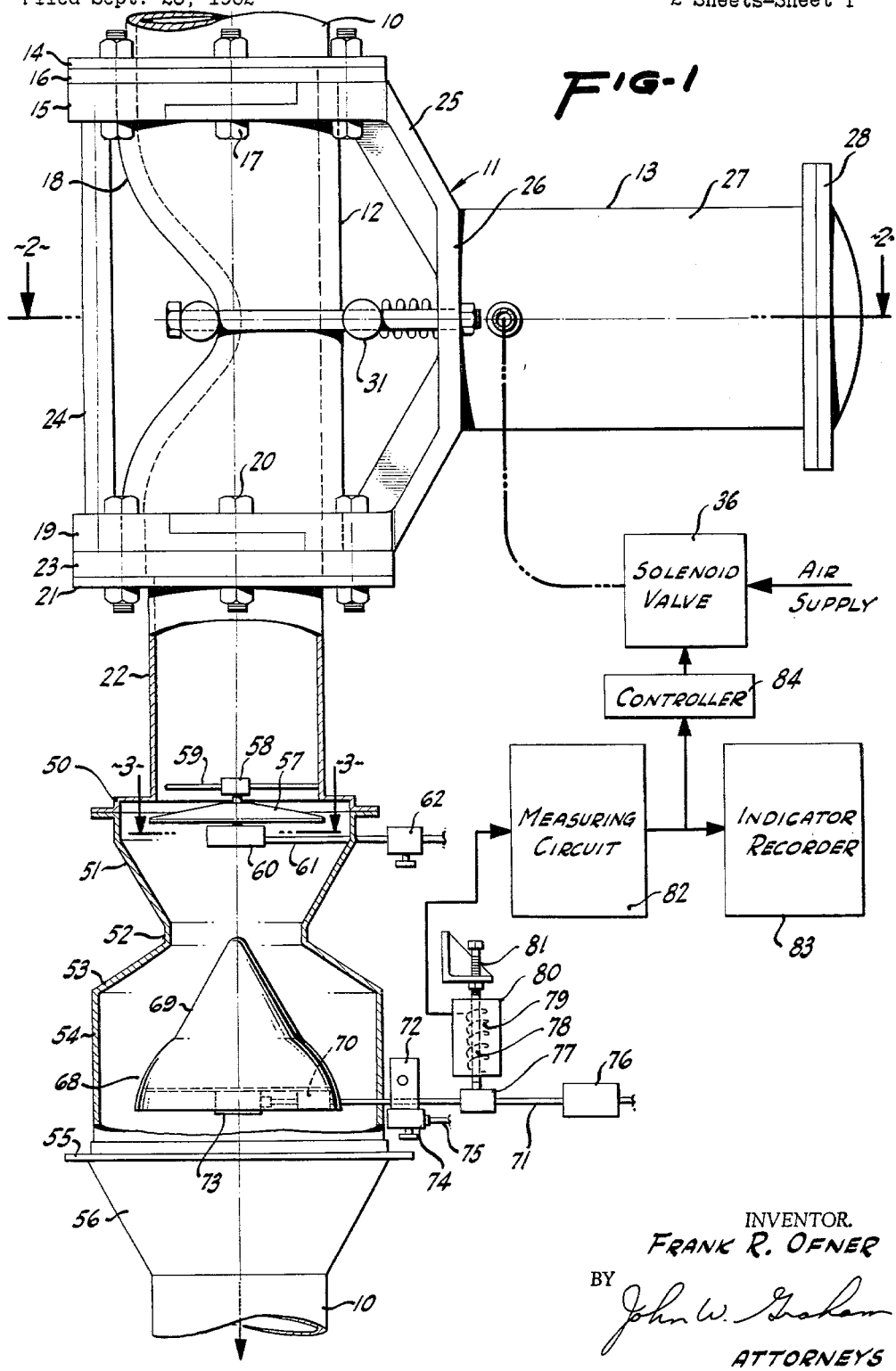
FIGURE 1 is a broken side view in elevation of a flow-measuring system embodying the invention, certain of the apparatus being shown in section and certain of the components in the system being illustrated diagrammatically.

The force-measuring apparatus illustrated in FIGURE 1 is especially adapted for use in measuring the weight rate of flow of a fluid material moving through a conduit, and in particular granular or pulverulent substances as, for example, wheat, flour, sugar, sand, solid fuels and the ingredients thereof, etc. The apparatus shown is intended to be interposed in a conduit through which such a fluid material flows, and a portion of such conduit is illustrated in FIGURE 1 and is designated with the numeral 10.

The apparatus includes a flow controller, designated generally with the numeral 11, which comprises a valve 12 and power or motor unit 13 for actuating the same. The controller 11 may be connected to the conduit 10 by any suitable means as, for example, by means of flanges 14 and 15 which receive therebetween a gasket 16, all of which are secured in the position illustrated by a plurality of bolts 17. The valve 12 in the specific embodiment being considered comprises an elongated flexible tube or sleeve 18 which may be a rubber composition, and the gasket 16 is defined by an outwardly extending annular end portion of the sleeve. Consequently, the sleeve at its upper end is connected to the flanges so that no leakage occurs therebetween, and the flange 14 may be welded or otherwise sealingly related to the conduit 10. The flange 15 is in the form of a split collar that permits the same to be mounted about the sleeve.

At its lower end, the sleeve 18 is related in a similar manner to a flange 19 which is connected by a plurality of bolts 20 to a flange 21 that is sealingly related to a connector conduit 22. A gasket 23 formed by an outwardly extending annular end portion of the sleeve is interposed between the flanges 19 and 21; and, thus, the sleeve is connected to the conduit 22 in a manner preventing the occurrence of leakage therebetween. The upper and lower flanges 15 and 19 are rigidly interconnected by a bar 24 extending therebetween on one side thereof, and by a bracket 25 extending therebetween on the opposite side thereof. Rigid with the bracket 25 and forming a part thereof is a plate 26 that defines an end closure for a cylinder 27, and both the plate and cylinder comprise components of the motor unit 13. Adjacent its opposite end, the cylinder 27 is equipped with end closure structure 28.

Mounted within the cylinder 27 for reciprocable movement therealong is a piston 29 equipped with a rod 30 that sealingly extends outwardly through an opening provided therefor in the end plate 26. Carried by the rod 30 at its outer end for movement therewith is a bar 31 that is slidably and reciprocably supported at the opposite ends thereof on a pair of guides or shafts 32 and 33 which respectively extend through openings provided therefor in the bar 31. The shafts 32 and 33 adjacent their outer ends respectively extend through openings provided therefor in a bar 34 that is oriented in parallel relation with the bar 31 and engages the flexible valve sleeve 18 along one side thereof at substantially its mid-portion, as shown in FIGURE 1. The shafts 32 and 33 are secured to and are carried by the plate 26 and, in the form shown, are elongated bolts that threadedly extend through tapped openings in the plate.

The sleeve 18 has a restriction therein of predetermined size that is determined by the bar 34 which engages the sleeve and bows it inwardly along the center portion thereof. It will be apparent that the extent to which the sleeve 18 is bowed inwardly by the bar 34 is adjustably determined by the lengths of the shafts 32 and 33—the effective lengths of which may be either increased or decreased by suitable adjustments thereof with respect to the plate 26, and the shafts are locked in any position of adjustment by nuts threadedly received on the ends of the shafts adjacent the plate 26. Thus, the maximum opening through the sleeve 18, which determines the maximum rate of flow of the material passing therethrough, may be predetermined, and in FIGURES 1 and 2 one such maximum opening is illustrated.

The sleeve 18 may be selectively and incrementally positioned between the maximum opening thereof and its completely closed position (shown by broken lines in FIGURE 2) by the bar 31 which engages the sleeve on the side thereof opposite the bar 34. Such adjustments are made by the motor unit 13, and the particular motor means shown normally biases the sleeve into the completely closed condition thereof. This result is effected by a helical spring 35, which at one end thereof seats against the bar 31 and at its other end seats against the plate 26, effective to bias the bar 31, piston rod 30, and piston 29 into their outermost position in which the sleeve 18 is compressed and constrained between the bars 31 and 34.

Operation of the motor means 13 is controlled by a solenoid-actuated valve 36 comprising a cylinder 37—the opposite end portions of which are vented through apertures 38 and 39. Reciprocable within the cylinder 37 is a spool valve 40 having axially spaced piston end portions 41 and 42 which slidingly and sealingly engage the inner walls of the cylinder 37. The spool valve 40 is biased toward the upper end (as viewed in FIGURE 2) of the cylinder 37 by a helical spring 43 coaxially surrounding a valve rod 44. At one end thereof, the rod 44 is rigidly secured to the spool valve 40 and extends through the lower end closure of the cylinder 37 and into a casing 45 that receives and supports therein a solenoid coil 46 adapted to be connected through a conduit 47 to a controller which regulatively energizes the solenoid to determine the position of the spool valve within the cylinder 37.

The cylinder 37 is in communication with the cylinder 27 through a flow conduit 48, and the cylinder 37 is also adapted to be connected to a source of compressed air (not shown) through an infeed conduit 49. In the condition of the solenoid valve 36 as shown in FIGURE 2, the solenoid coil 46 is being energized, and as a consequence thereof the spool valve 40 is displaced to its maximum downward position within the cylinder 37. Therefore, pressure fluid is being supplied to the cylinder 27 through the conduit 48, annular chamber defined between the piston sections 41 and 42 of the spool valve, and infeed conduit 49. As a result, the piston 29 is fully displaced within the cylinder 27 against the biasing force of the spring 35, and the sleeve 48 is at its maximum opening.

When the solenoid coil 46 is completely deenergized, the spring 43 displaces the spool valve 40 into its uppermost position, at which time the piston section 42 of the valve isolates the infeed conduit 49 from the supply conduit 48, and the latter is vented to atmosphere through the port 39. Therefore, the spring 35 of the motor unit is effective to displace the piston 29, rod 30 and bar 31 to the outermost or normal position thereof, which results in the sleeve 18 being completely closed, as shown by broken lines in FIGURE 2. Substantially no leakage of pressure fluid will occur at this time because the infeed conduit 49 is then in communication with the annular chamber defined between the piston sections 41 and 42 of the spool valve, which chamber is effectively closed by such sections. The vented end portions of the cylinder 37 permit the spool valve 40 to reciprocate freely within the cylinder.

It will be appreciated that the spool valve may be adjustably positioned within the cylinder 37 so that the conduit 48 is only partially open; and once the sleeve 18 is adjusted to an opening size proper to accommodate a desired flow rate, the piston section 42 of the spool valve will be positioned in contiguous relation with the conduit 48 to close the same, whereby pressure fluid will neither be supplied to nor released from the cylinder 27.

Communicating with the connector conduit 22 adjacent the lower end thereof is a distribution chamber 50 having an inverted, frusto-conical or funnel-shaped lower end portion 51 connected through a restricted neck 52 with a frusto-conical upper end portion 53 of a sensing chamber 54. The sensing chamber 54 is secured at its lower end by a flange 55 to an inverted, frusto-conical or funnel-shaped spout 56 that in turn is connected to a continuation of the conduit 10. Substantially conventional means may be employed to interconnect the various chambers and flow conduits, as is well known in the art.

Mounted within the distribution chamber 50 is a flow interrupter 57 in the form of a frusto-conical or upwardly convex disc suspended from a connector 58 equipped with a plurality of support rods 59 that are welded or otherwise rigidly secured to the conduit 22. Also secured to the connector 58, below the interrupter 57 so as to be shielded thereby from the material flowing through the conduit 22, is a vibrator 60 operative to impart vibratory energy to the interrupter 57; and it is used to displace material therefrom which tends to cling to the disc and build up thereon either because of the inherent stickiness of such material, because of electrostatic attractions, or for any other reason. The vibrator 60 is pneumatically energized through an infeed tube 61 having an adjustable valve 62 interposed therein. The conduit 61 is adapted to be connected to a source of pressurized fluid, such as compressed air, and the valve 62 may be selectively positioned between fully open and fully closed positions to regulate the quantity of fluid being supplied to the vibrator 60, and therefore, the the amount of vibratory energy transmitted thereby to the interrupter 57.

The vibrator 60 is illustrated in detail in FIGURE 3, and comprises a casing 63 defining an annular or toroidal race 64 therein adapted to be traversed by a relatively heavy sphere 65 in the nature of a ball bearing. The casing 63 provides an inlet passage 66 having a tapped outer end portion that is connected to the tube 61, and the casing similarly provides an outlet passage 67 which may be vented directly into the distribution chamber 50 when the material flowing therethrough is not adversely affected by air, which is generally the case. Quite evidently, when pressure fluid is delivered to the race 64 through the inlet passage 66, the ball 65 will accelerate about the race; and such movement of the ball will vibrate the casing 63 and the flow interrupter to which it is connected.

The flow interrupter 57 has a larger diameter than that of the flow conduit 22 disposed thereabove, which has a generally vertical orientation; and as a result, all of the material flowing downwardly through the conduit 22 has its downward velocity terminated by the interrupter 57 which, then, enforces a velocity of known value (namely, zero) upon the material at the moment of impact thereof with the interrupter. The material spilling over the peripheral edge portion of the interrupter 57 is directed downwardly and inwardly by the converging funnel-shaped section 51, and falls against or impacts a sensing element 68—the maximum diameter of which is substantially greater than that of the restricted neck 52. Evidently, the impact velocity of the material at the moment of impact thereof with the sensing element is a known value because the distance between the interrupter 57 and sensing element is predetermined.

The lower end portion of the sensing element 68 has a generally hemispherical configuration that merges into a cone-shaped upper end portion 69, the apex of which is adjacent the neck 52. The sensing element 68 is rigidly secured by appropriate mounting structure, such as a connector block 70, to an elongated rod or lever 71 that extends outwardly through the wall of the sensing chamber 54. The lever is supported exteriorly of the chamber 54 by bearing structure 72 for pivotal movement about an axis generally normal to the plane of the drawing, and the wall of the chamber 54 provides a sufficiently large opening (closable by a flexible boot or seal, not shown) to permit limited pivotal movement of the lever.

The lever 71 is hollow or tubular, and at the inner end thereof connects to a vibrator 73 which may be of the same construction as the vibrator 60 heretofore described and shown in detail in FIGURE 3. Therefore, the hollow arm 71 is connected to the inlet of such vibrator and the outlet thereof will be exhausted into the sensing chamber 54. Compressed air is supplied to the vibrator 73 through the hollow arm 61, and adjustable valve 74 in flow communication therewith, and an inlet conduit 75 adapted to be connected to a suitable source of compressed air. The outer end of the lever 71 is necessarily closed if it is hollow from end to end thereof, and mounted upon such end is a counterweight 76 to balance the weight of the sensing element 68 and components associated therewith. The bearing structure 72 may be an air bearing or other structure for minimizing resistance to free pivotal movement of the arm 71 as, for example, the flexural pivot center shift bearing sold by the Bendix Corporation under the trade name Free-Flex flexural pivots.

Rigidly secured to the lever 71 intermediate the bearing structure 72 and counterweight 76 is a force applicator 77 having an upwardly extending projection adapted to firmly abut and press against the lower end of a magnetostrictive core 78 energized by an alternating current, as through a coil 79. The coil and core composition is comprised by a load or sensing cell 80 which is adapted to convert mechanical force into electrical energy as a reflection of the magnitude of such force. The core 78 at its upper end bears against adjustable stop structure 81 that rigidly constrains the core against displacements along the longitudinal axis thereof.

When a material flows downwardly through the conduit 10 and impacts the sensing element 68, it tends to displace the same downwardly relative to the sensing chamber 54 generally along the longitudinal axis thereof. The resultant force acting downwardly upon the sensing element 68 tends to pivot the arm 71 about the axis through the bearing structure 72 in a counter-clockwise direction, whereupon the force applicator 77 bears upwardly against the core 78. Since the core is rigidly constrained against movement by the stop structure 81, the arm 71 and sensing element 68 remain substantially stationary. However, the arrangement described defines a force amplification or multiplication system in that the force at the sensing element 68 acts through a lever arm that is substantially longer than the length of the lever arm through which the reaction force at the core 78 is being applied; and therefore, the summation of moments about the axis through the bearing 72 establishes that the force exerted against the core 78 by the force applicator 77 is greater in magnitude than the force acting downwardly upon the sensing element 68. In certain instances, it may be desirable to further amplify or magnify the value of the force exerted against the core 78 by the force applicator 77, and a structure successfully used for this purpose is a Sylphon bellows which would be inserted between the force applicator 77 and lower end of the core 78.

The core 78 is a piezo-magnetic nickel-zinc-ferrite composition—the permeability of which changes substantially linearly in response to the magnitude of a force applied thereto. Consequently, the inductance of the sensing unit 80 (and in particular the coil composition 78–79 thereof) is altered in accordance with any such changes in the permeability of the core. Thus, a signal which a reflection of any contemporary value of the permeability, and therefore of the magnitude of the force establishing the stress in the core, is fed to a measuring circuit 82 which may include a demodulator and amplification network; and the output thereof is fed to an indicia device 83 which may be a milliammeter calibrated to read force directly or the weight rate of flow of a material in terms of force per unit of time (e.g., pounds per minute), or it may be an indicator-recorder which may or may not include a totalizer.

The output signal from the measuring circuit 82 is also fed to a controller 84 which compares such signal to a preselected standard and energizes or adjusts the solenoid valve 36 in accordance with the results of such comparison to increase, decrease, or maintain the flow rate at the contemporary value thereof, as necessary to provide the desired flow rate through the conduit 10. Thus, the arrangement described provides a feedback control means by which the size of the opening through the valve sleeve 18 is selectively adjusted in accordance with the measured value of the contemporary flow therethrough to maintain the flow rate at a predetermined value.

The indicia device 83 and controller 84 may be of standard design as, for example, equipment of this type manufactured by the Minneapolis-Honeywell Regulator Company.

While in the foregoing specification an embodiment of the invention has been set forth in considerable detail for purposes of adequately disclosing the same, it will be apparent to those skilled in the art that numerous changes may be made in such details without departing from the spirit and principles of the invention.

I claim:

1. In combination with an upwardly oriented conduit adapted to have a particulate material flowing downwardly therethrough, a system for measuring the weight rate of downward flow of such material within said conduit and for automatically controlling the weight rate of flow of the material therethrough in response to such measurements to effect a predetermined flow rate, said system including a sensing element interposed in said conduit so as to be impact-engaged by such material flowing downwardly therethrough and being responsive to the value of the impact force thereof as a reflection of the flow rate, mounting structure supporting said sensing element within said conduit so as to permit at least limited vertical displacements of the sensing element while constraining the same against lateral displacements so that only the vertically oriented components of such impact force are responsibly detected by said sensing element, means comprising a flow interrupter disposed within said conduit upstream of said sensing element for disturbing the downward flow of material for establishing the velocity thereof at a known value at the moment of impact thereof with said sensing element, valve structure located along said conduit upstream of said sensing element therein for determining the weight rate of flow of material theretoward, and feedback control means responsive to any contemporary value of the impact force imparted to said sensing element by the material impacting thereagainst for regulatively adjusting said valve structure in accordance with the selective requirement for the maintenance of or a change in the weight rate of flow of material through said conduit to provide the aforementioned predetermined flow rate.

2. In combination with an upwardly oriented conduit adapted to have a particulate material flowing downwardly therethrough, a system for measuring the weight rate of downward flow of such material within said conduit, said system including a sensing element interposed in said conduit so as to be impact-engaged by such material flowing downwardly therethrough and being responsive to the value of the impact force thereof as a reflection of the flow rate, mounting structure supporting said sensing element within said conduit so as to permit at least limited vertical displacements of the sensing element while constraining the same against lateral displacements so that only the vertically oriented components of such impact force are responsibly detected by said sensing element, and means comprising a flow interrupter disposed within said conduit upstream of said sensing element for disturbing the downward flow of material for establishing the velocity thereof at a known value at the moment of impact thereof with said sensing element, said sensing element having a generally hemispherical configuration throughout a substantial portion of the upwardly facing surface thereof merging into a generally conical configuration at substantially the center of impact thereagainst of the material flowing downwardly through said conduit.

3. The combination according to claim 2, and further comprising vibrator means mechanically related to said sensing element for imparting vibratory energy thereto to prevent the accumulation thereon of such downwardly flowing material.

4. In combination with an upwardly oriented conduit adapted to have a particulate material flowing downwardly therethrough, a system for measuring the weight rate of downward flow of such material within said conduit and for automatically controlling the weight rate of flow of the material therethrough in response to such measurements to effect a predetermined flow rate, said system including a sensing element interposed in said conduit so as to be impact-engaged by such material flowing downwardly therethrough and being responsive to the value of the impact force thereof as a reflection of the flow rate, said sensing element having a generally hemispherical configuration throughout a substantial portion of the upwardly facing surface thereof merging into a generally conical configuration at substantially the center of impact thereagainst of the material flowing downwardly through said conduit, mounting structure supporting said sensing element within said conduit so as to permit at least limited vertical displacements of the sensing element while constraining the same against lateral displacements so that only the vertically oriented components of such impact force are responsibly detected by said sensing element, means comprising a flow interrupter disposed within said conduit upstream of said sensing element for disturbing the downward flow of material for establishing the velocity thereof at a known value at the moment of impact thereof with said sensing element, valve structure located along said conduit upstream of said sensing element therein for determining the weight rate of flow of material theretoward, and feedback control means responsive to any contemporary value of the impact force imparted to said sensing element by the material impacting thereagainst for regulatively adjusting said valve structure in accordance with the selective requirement for the maintenance of or a change in the weight rate of flow of material through said conduit to provide the aforementioned predetermined flow rate.

5. The combination according to claim 4, and further comprising vibrator means mechanically related to said sensing element for imparting vibratory energy thereto to prevent the accumulation thereon of such downwardly flowing material.

References Cited by the Examiner
UNITED STATES PATENTS

| 2,569,085 | 9/1951 | Wood et al. | |
| 2,578,118 | 12/1951 | Wood | 73—434 |
| 2,605,638 | 8/1952 | Pearson | 73—228 |
| 2,734,526 | 2/1956 | Aagaard | 137—486 |
| 2,746,375 | 5/1956 | Abbott et al. | 222—196 X |
| 2,872,073 | 2/1959 | Harper | 222—55 |
| 2,872,074 | 2/1959 | Birtwell et al. | 222—55 |
| 3,015,768 | 1/1962 | Hornfeck et al. | 137—487.5 |
| 3,056,293 | 10/1962 | Ofner | 73—198 |
| 3,068,387 | 12/1962 | Koppel | 137—487.5 X |
| 3,099,138 | 7/1963 | Hightower et al. | 222—200 X |

FOREIGN PATENTS

| 245 | 1915 | Great Britain. |
| 355,921 | 9/1931 | Great Britain. |

RICHARD C. QUEISSER, *Primary Examiner.*